Patented Feb. 3, 1953

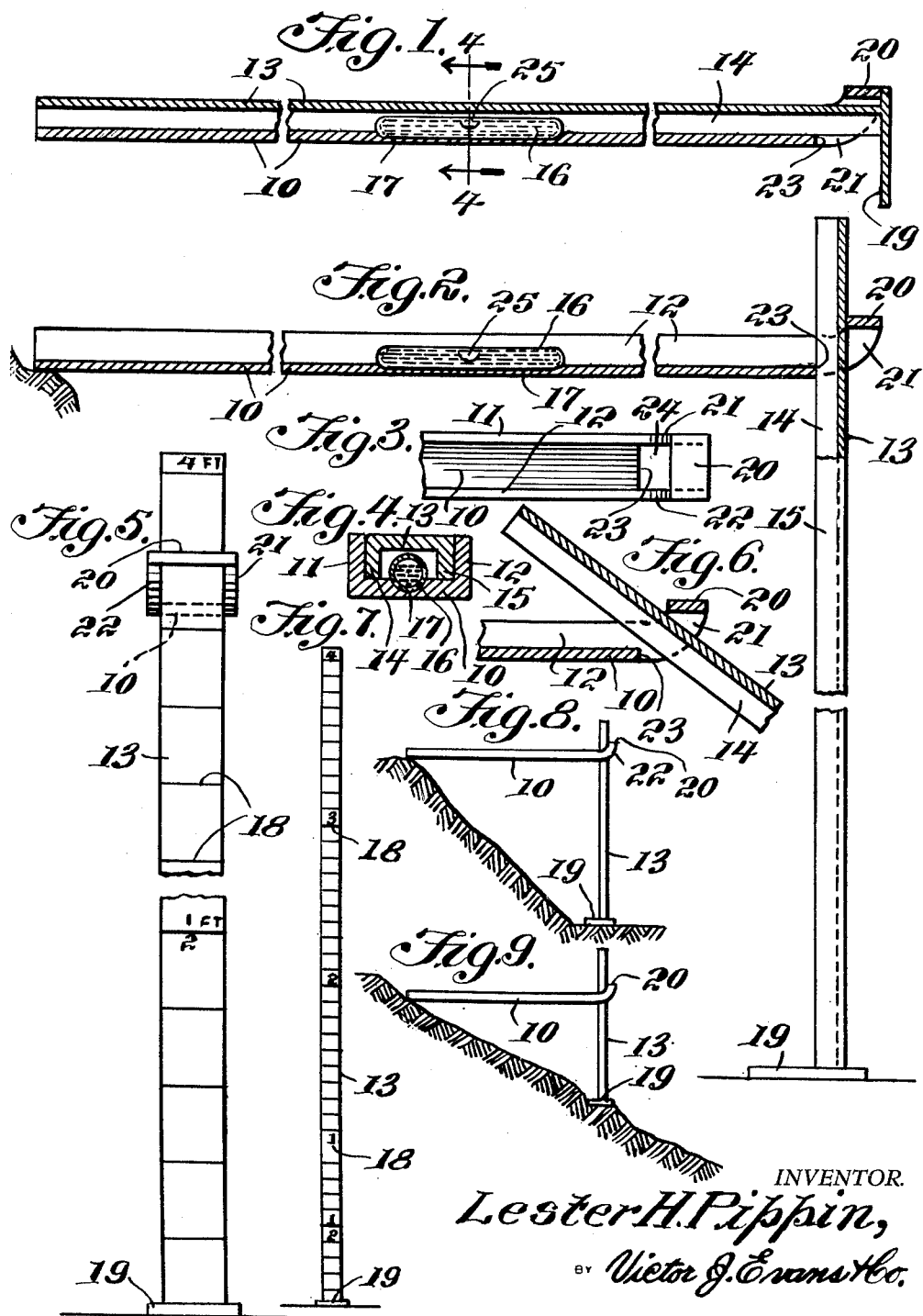

2,627,115

UNITED STATES PATENT OFFICE 2,627,115

LEVEL

Lester H. Pippin, Hinsdale, Mont.

Application March 2, 1951, Serial No. 213,588

2 Claims. (Cl. 33—89)

This invention relates to instruments of the type used by surveyors and the like, and in particular an instrument adapted to be used by one man for measuring the height of a grade or sloping surface or fill wherein a vertically positioned measuring stick extends through a horizontally disposed bar having a spirit level therein wherein with the stick standing on a grade and the bar held in a level position with one end on the grade and the other on the stick the height at that point, is indicated on the stick.

The purpose of this invention is to provide an elevation measuring instrument whereby grades or slopes may readily be measured by the average layman without the use of scientific or surveying instruments.

In measuring elevations, particularly of grades or slopes in fills and also in fields it is difficult to measure the height of the soil of ground without a surveyor's leveling instrument. In numerous instances particularly in making fills for roadways and in grading fields on farms and the like it is desirable to ascertain the depth without the necessity of resorting to surveyor's instrument. With this thought in mind this invention contemplates a device including a pair of telescoping rods or sticks with a spirit level in one member and with units of measure indicated on the other whereby with the member on which the units of measure are provided held in a vertical position and the member with the spirit level held horizontal the depth of a sloping surface, may readily be determined.

The object of this invention is, therefore, to provide means for forming an instrument whereby the parts may readily be set up on grades or ground slopes so that the depth may readily be measured.

Another object of the invention is to provide a measuring instrument or level for determining the depth of grades that may be used by the average layman.

A further object of the invention is to provide a grade measuring device which is of a simple and economical construction.

With these and other objects and advantages in view the invention embodies a pair of channel shaped bars, one of which has a spirit level bubble glass embedded therein and an opening through one end and the other of which is provided with spaced graduation representing feet and inches.

Other features and advantages of the invention will appear from the following description taken in connection with the drawing, wherein:

Figure 1 is a longitudinal section through the grade level measuring device showing the parts assembled.

Figure 2 is a similar section showing the parts in operative position and with part of the vertical member shown in elevation.

Figure 3 is a plan view showing one end of the horizontally disposed member with parts thereof broken away.

Figure 4 is a cross section through the instrument with the parts assembled being taken on line 4—4 of Fig. 1.

Figure 5 is an end elevational view illustrating the parts in positions as shown in Fig. 2.

Figure 6 is a detail illustrating the method of twisting the vertical member in the horizontal member and opening or closing the instrument.

Figure 7 is an end elevational view, similar to that show in Fig. 5 showing the graduations on the vertical member.

Figure 8 is an elevational view illustrating the relative positions of the parts with the instrument used for determining the elevation of ground on a grade.

Figure 9 is a similar view showing the device used on a grade of a comparatively small angle.

Referring now to the drawing wherein like reference characters denote corresponding parts, the grade measuring level of this invention includes a horizontally disposed bar channel shaped in cross section having a base 10 and upwardly extended side walls 11 and 12, a vertically disposed bar 13 having a base with extended side walls 14 and 15, and a bubble glass 16 that is positioned in a recess 17 in the base 10 of the horizontally disposed bar.

The bar 13 is provided with spaced graduations 18 and the lower end thereof is provided with a base 19 that may be positioned on the ground, or other surface, as illustrated in Figs. 8 and 9.

The horizontally disposed bar is provided with an arcuate outer end with a panel 20 supported by arcuate sections 21 and 22 of the side walls 11 and 12, respectively, and with the base terminating at the point 23 an opening 24 is provided through the horizontally disposed bar and through which the bar 13 extends, as illustrated in Fig. 2.

With the parts arranged in this manner the foot or base 19 of the bar 13 is positioned upon the ground and with the bar extended through the opening 24 in the horizontally disposed bar and with the opposite end of the horizontally disposed bar resting upon the ground, the end through which the bar 13 extends is moved upwardly and downwardly until a bubble 25 in the glass 16 assumes an intermediate position to indicate that the horizontally disposed bar is level and with the bars held in this position the height is indicated by the point of intersection of the lower surface of the horizontally disposed bar with the graduations on the bar 13.

The bar 13 is slidable in the horizontally disposed bar and when not in use the parts are telescoped or assembled as illustrated in Fig. 1.

It will also be understood that although the bars are illustrated as being channel shaped in cross section, the bars may be of other suitable shapes and the bars may be formed of any suitable material.

It will also be understood that the spirit level may be mounted in the horizontal bar by other suitable means.

The graduation on the measuring bar may be provided in feet and inches or in suitable scales whereby grades are readily determined in convenient units of measure.

It will be understood that other modifications may be made in the design and arrangement of the parts without departing from the spirit of the invention.

What is claimed is:

1. In a grade measuring level, the combination which comprises a horizontally disposed bar, channel shaped in cross section having a base with upwardly extended side walls and with said side walls having arcuate upwardly extended sections at one end, a transversely disposed panel positioned parallel to the base and connecting the upwardly extended sections of the side walls of the bar, the end of the said base positioned between the ends of the side walls from which the arcuate upwardly disposed sections extend terminating at a point in a plane spaced from a plane on the inner edge of the said panel connecting the upper ends of the arcuate upwardly extended sections of the side walls, the planes corresponding with the end of the base and the inner edge of the panel being parallel and also being perpendicular to the said base, the upper surface of the said base adapted to hold a spirit level bulb with the bulb positioned between the ends of the bar, and a measuring bar also channel shaped in cross section having a base with extended side walls, having units of measure on one face thereof and having a foot on one end, said measuring bar being slidably mounted in the horizontally disposed bar and extended through the opening between the end of the base and panel.

2. In a grade measuring instrument, the combination which comprises a level bar, channel shaped in cross section, having an opening through one end and a bubble glass in the intermediate part thereof, and a measuring bar also channel shape in cross section nested in the said level bar and positioned to extend through the said opening therein, said measuring bar having units of measure thereon, and said level bar having a stop plate carried by upwardly extended arcuate flanges on the end thereof and positioned on one side of the said opening therein.

LESTER H. PIPPIN.

REFERENCES CITED

The following references are of record in the file of this patent:

UNITED STATES PATENTS

| Number | Name | Date |
|---|---|---|
| 310,154 | Tyler | Dec. 30, 1884 |
| 775,184 | Kacksmeier | Nov. 15, 1904 |
| 1,173,860 | Crater | Feb. 29, 1916 |
| 1,199,355 | Edmiston | Sept. 26, 1916 |
| 1,200,410 | Chemrinsky | Oct. 3, 1916 |
| 1,274,696 | De Lay | Aug. 6, 1918 |
| 1,276,501 | Douglas | Aug. 20, 1918 |
| 1,864,457 | Nelson | June 21, 1932 |

FOREIGN PATENTS

| Number | Country | Date |
|---|---|---|
| 1,240 | Great Britain | Mar. 29, 1878 |